M. BOUCHET.
PORTABLE VULCANIZING APPARATUS.
APPLICATION FILED NOV. 23, 1909.
965,620.
Patented July 26, 1910.
2 SHEETS—SHEET 1.
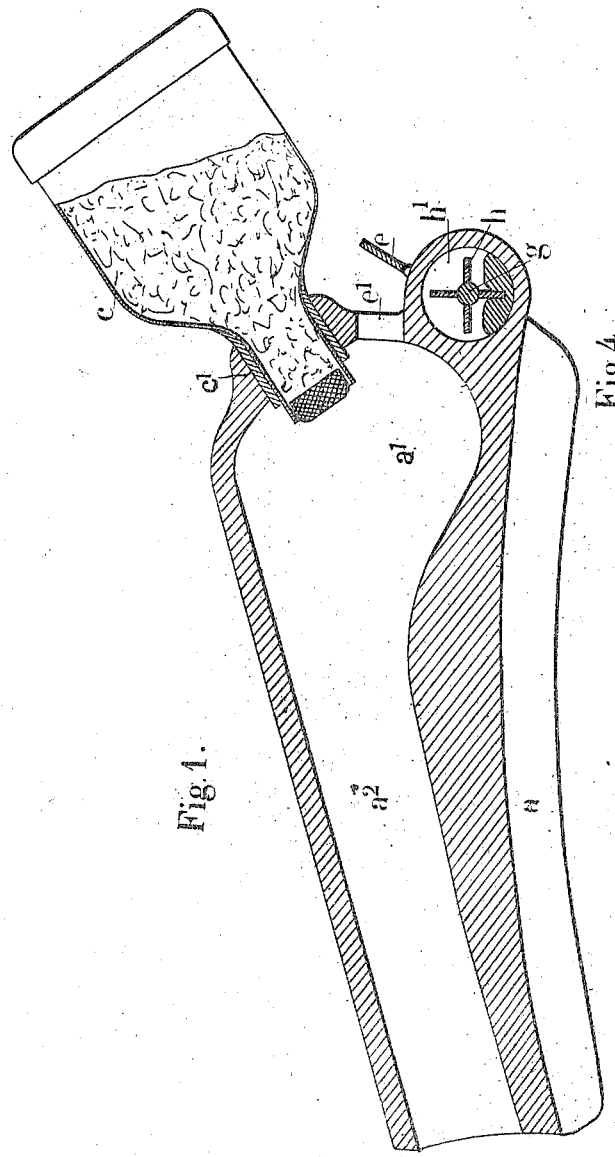
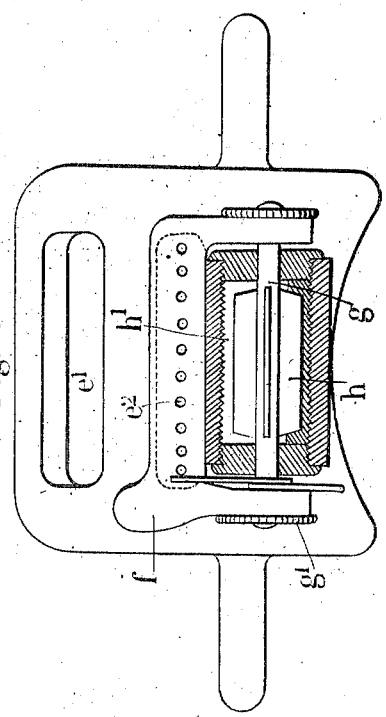
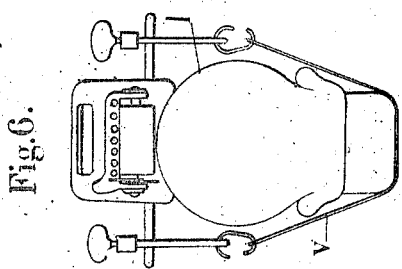
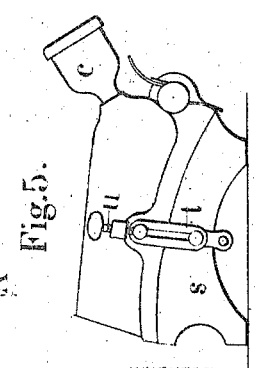
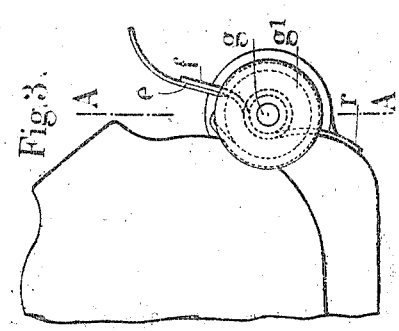
INVENTOR
Maurice Bouchet
BY Munn & Co
ATTORNEYS
WITNESSES
J. P. Davis
P. D. Rollhaus M. BOUCHET.
PORTABLE VULCANIZING APPARATUS.
APPLICATION FILED NOV. 23, 1909.
965,620.
Patented July 26, 1910.
2 SHEETS—SHEET 2.
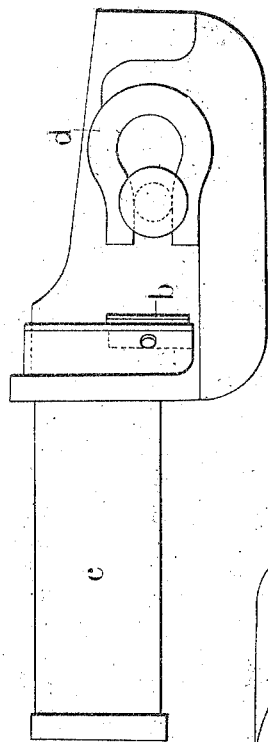
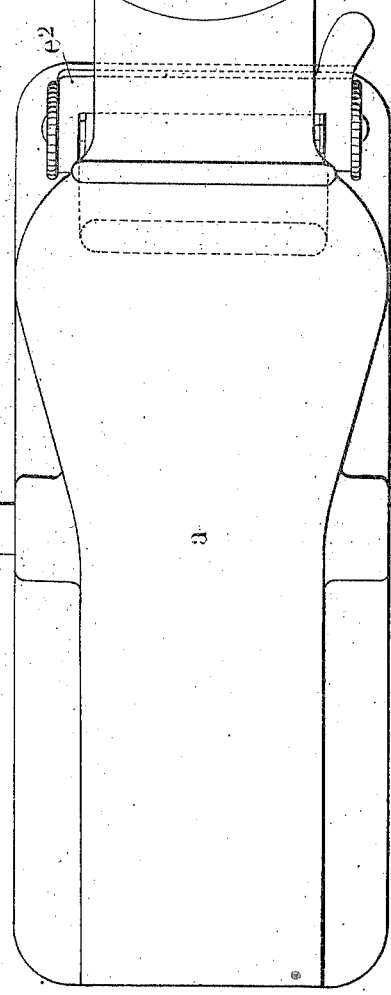
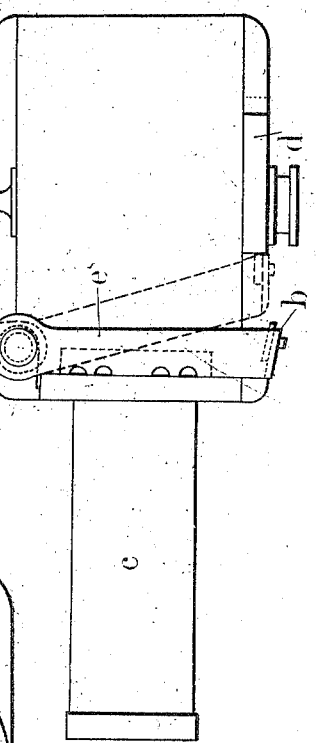
INVENTOR
Maurice Bouchet
BY Munn & Co.
ATTORNEYS

UNITED STATES PATENT OFFICE.

MAURICE BOUCHET, OF PARIS, FRANCE.

PORTABLE VULCANIZING APPARATUS.

965,620.  Specification of Letters Patent.  Patented July 26, 1910.

Application filed November 23, 1909. Serial No. 529,531.

*To all whom it may concern:*

Be it known that I, MAURICE BOUCHET, a citizen of the French Republic, and a resident of 22 Rue Alphonse de Neuville, in the city of Paris, Republic of France, engineer, have invented a Portable Vulcanizing Apparatus, of which the following is a full, clear, and exact description.

The invention relates to a portable vulcanizing apparatus for heating at constant temperature and for a definite period of time, different articles and particularly articles made of indiarubber, for the purpose of vulcanizing the same. It is known that for this operation the body treated should be brought exactly to the temperature of 140° C. and the heating should last for a definite period of time.

The vulcanizing apparatus which have been made up to the present time necessitate the constant attention of the attendant for the purpose of controlling the temperature, specially with portable apparatus and in any case for cutting off the heating when the operation is finished.

The present invention has for object an apparatus by means of which the bodies to be treated are brought automatically to the required temperature and the heating is cut off automatically when the time for heating is ended.

This apparatus consists in a hollow metal block adapted to be placed in contact with the article to be vulcanized; this block carries a lamp which serves to heat it and the heat emitted by the lamp is automatically lowered when the block has reached the required temperature. The heat emitted by the lamp is brought to a sufficient degree by means of a spring releasing system freed by the fusion of an alloy melting at the required temperature.

The invention is shown by way of example in the accompanying drawing in which:

Figure 1 is a vertical section of the apparatus. Fig. 2 is a corresponding plan view thereof. Fig. 3 is a side view. Fig. 4 is a section made according to line A—A of Fig. 3. Figs. 5 and 6 show the application of the apparatus. Figs. 7 and 8 show a modification.

As shown in the drawings, the apparatus is constituted by a body $a$ the lower face of which is slightly curved. This body is internally recessed, so as to present a combustion chamber $a^1$ and a flue $a^2$. The rear end of the body is provided with a recess in which is arranged a lamp $c$; an asbestos joint $c^1$, carried by the body or by the lamp, insulates the latter from the body of the apparatus. Underneath the recess where is placed the lamp is arranged an air inlet $e^1$ which may be closed by a screen $e$ provided with small holes $e^2$. This screen is carried by arms $f$ frictionally rotating on milled heads $g^1$ mounted on the axis $g$. This axis carries small wings or blades $h$ plunging in a bath of alloy contained in a small chamber $h^1$. Springs $r$ tend to press the screen $e$ against the air supply opening.

Fastening bonds $t$ with tightening screws $u$ permit the apparatus to be secured either on the stand $s$ or to the rim of the wheel, by means of a belt $v$, as shown in Fig. 6, according as an air tube or a cover is repaired.

The operation of this device is as follows: The body to be repaired being prepared and the apparatus arranged as shown in Fig. 5 or in Fig. 6 and the fastening bonds being suitably tightened, the lamp $c$ is placed in position. The screen $e$ is removed from the opening $e^1$, by turning the arms $f$ on the milled heads $g^1$, the latter being maintained immovable, since the blades $h$ are held in the solidified alloy. The lamp is then lighted through the orifice $e^1$. When the required temperature has been reached, the alloy melts; the springs $r$ tend to return the arms $g$ and to press the screen $e$ against the opening $e^1$; when the alloy becomes sufficiently fluid, it permits the closing of the screen and as this alloy is still in a pasty state, this closing is effected slowly. Then the air reaches to the lamp only through the holes $e^2$, the lamp burns in such manner that the heat produced is just sufficient to maintain the temperature sensibly constant. Besides, the capacity of the lamp is calculated in such a manner that the duration of the constant temperature is that of the vulcanizing operation.

As it will be seen, the working of the apparatus comprises two periods. In the first period, an intensive heating is produced, adapted to bring the apparatus to the vulcanizing temperature. In the second period, the apparatus is maintained at a constant temperature, during the time necessary for the vulcanization. The cutting off of the intensive heating, on the one hand and the total cessation of the heating on the other hand, are produced automatically at the desired time without the apparatus requiring any attention.

The arrangement of the apparatus and of the fastening bonds reduces to the minimum the loss of heat by conductibility. The arrangement of the stand $s$ permits the indiarubber pieces to be repaired without the same being mounted on the wheel, according to their normal incurvation and not flatwise, which is preferable.

Figs. 7 and 8 show a modification of the releasing device for the screen, in which the screen $e$ carries an armature $b$ attracted by the magnet $d$. The armature is made of an alloy, of steel or nickel for example, which ceases to be attracted by the magnet at a certain temperature depending on the amount of nickel. Therefore the alloy may be suitably chosen so that the armature is released at the temperature for vulcanization and lowers, at this moment, the heat emitted by the lamp, as in the preceding arrangement.

Claims:

1. An automatic portable vulcanizing apparatus comprising a hollow block, a lamp, an air supply opening, a screen which may close said opening and provided with small holes and an automatic releasing device for the screen.

2. An automatic portable vulcanizing apparatus comprising a hollow block, a lamp, an air supply opening, a screen which may close said opening and provided with small holes, an automatic releasing device for the screen and blades integral with the axis of the screen and plunging in a bath of fusible alloy.

3. An automatic portable vulcanizing apparatus comprising a hollow block having a hollowed and incurved face presenting in concave form the shape of the indiarubber tires, a lamp, an air supply opening, a screen which may close said opening and provided with small holes and an automatic releasing system for the screen.

The foregoing specification of my portable vulcanizing apparatus signed by me this twelfth day of November 1909.

MAURICE BOUCHET.

Witnesses:
 DEAN B. MASON,
 R. EHIRIOT.